United States Patent [19]

Brinkmann et al.

[11] 4,140,463

[45] Feb. 20, 1979

[54] APPARATUS FOR PRODUCING ARTICLES OF THERMOPLASTIC RESIN

[75] Inventors: Walter Brinkmann, St. Augustin; Karl-Heinz Schröder, Königswinter; Peter P. Stommel, Hennef; Herbert K. Rahlfs, Troisdorf, all of Fed. Rep. of Germany

[73] Assignee: Reifenhäuser KG, Troisdorf, Fed. Rep. of Germany

[21] Appl. No.: 828,185

[22] Filed: Aug. 26, 1977

Related U.S. Application Data

[63] Continuation-in-part of Ser. No. 745,571, Nov. 29, 1976, abandoned.

[30] Foreign Application Priority Data

Nov. 27, 1975 [DE] Fed. Rep. of Germany ....... 2553247

[51] Int. Cl.$^2$ ............................................. B29F 3/08
[52] U.S. Cl. .................................... 425/377; 138/138; 138/DIG. 3; 425/378 R; 425/404; 425/461
[58] Field of Search ............... 425/376 R, 377, 378 R, 425/404, 379 R, 461; 138/125, 126, 127, 137, 138, 177, DIG. 3, 149; 264/176 R

[56] References Cited

U.S. PATENT DOCUMENTS

| 3,109,461 | 11/1963 | Wolff et al. | 138/137 |
| 3,522,413 | 8/1970 | Chrow | 138/149 X |
| 3,826,602 | 7/1974 | Shaffer et al. | 425/378 R |

Primary Examiner—Richard B. Lazarus
Assistant Examiner—Mark Rosenbaum
Attorney, Agent, or Firm—Karl F. Ross

[57] ABSTRACT

Sheets, strips or filaments of thermoplastic resin are produced by one or more extruders working into a remote shaping die that is movably juxtaposed with a cooling drum around which the hot product issuing from the die mouth is to be wound, the die being connected with the extruder or extruders via one or more flexible ducts having heating elements embedded in their walls. Each duct may comprise an inner hose of Teflon, an outer envelope of reinforced silicone rubber and various intermediate layers including a heating layer in the form of a wire coil or mesh and a surrounding heat barrier of asbestos.

6 Claims, 4 Drawing Figures

APPARATUS FOR PRODUCING ARTICLES OF THERMOPLASTIC RESIN

CROSS-REFERENCE TO RELATED APPLICATION

This is a continuation-in-part of our copending application Ser. No. 745,571 filed 29 Nov. 1976 and now abandoned.

FIELD OF THE INVENTION

Our present invention relates to an apparatus for the production of flexible articles, such as sheets, strips, filaments of narrow profiles, from synthetic resin by means of one or more extruders working into a remote shaping die.

BACKGROUND OF THE INVENTION

Such extruded articles, usually made from thermoplastic materials, are generally hardened after leaving the shaping die by being wound around a cooling roller or drum. Especially in the case of a foil or sheet issuing from a wide-mouth die, but also with other extruded articles, objectionable stresses due to improper winding are avoided by relatively reciprocating the die and the drum according to conventional practice. Strips, filaments or the like of finite length, coming from the extruder, can also be wound about the drum in a multiplicity of turns by a relative displacement of the die and the drum in the direction of the drum axis.

In order to avoid the need for bodily shifting both the die and the associated extruder or extruders, the latter can be connected with the die via one or more deformable ducts or conduits giving the die a certain mobility. Thus, U.S. Pat. No. 3,734,662 proposes the use of an articulated conduit with externally heated tube sections and joints for this purpose.

OBJECT OF THE INVENTION

The object of our present invention is to provide an improved type of duct allowing limited relative displacement of one or more extruders and an associated shaping die in any direction.

SUMMARY OF THE INVENTION

Pursuant to our present invention, such a duct comprises a flexible tube having heating means embedded in the wall thereof, thus in close proximity to the resinous mass flowing through that tube.

More specifically, the resinous tube constituting our improved mass-flow duct comprises an inner hose of low-friction heat-resistant polymeric material, namely polytetrafluoroethylene (Teflon), closely embraced by one or more reinforcing webs of wire netting and surrounded by a protective envelope, the heating means being wrapped around the reinforcing web or webs within that envelope. In order to minimize heat losses, we interpose a thermally insulating layer between the heating means and the envelope.

BRIEF DESCRIPTION OF THE DRAWING

The above and other features of our invention will now be described in detail with reference to the accompanying drawing in which.

SPECIFIC DESCRIPTION

Figure 1:
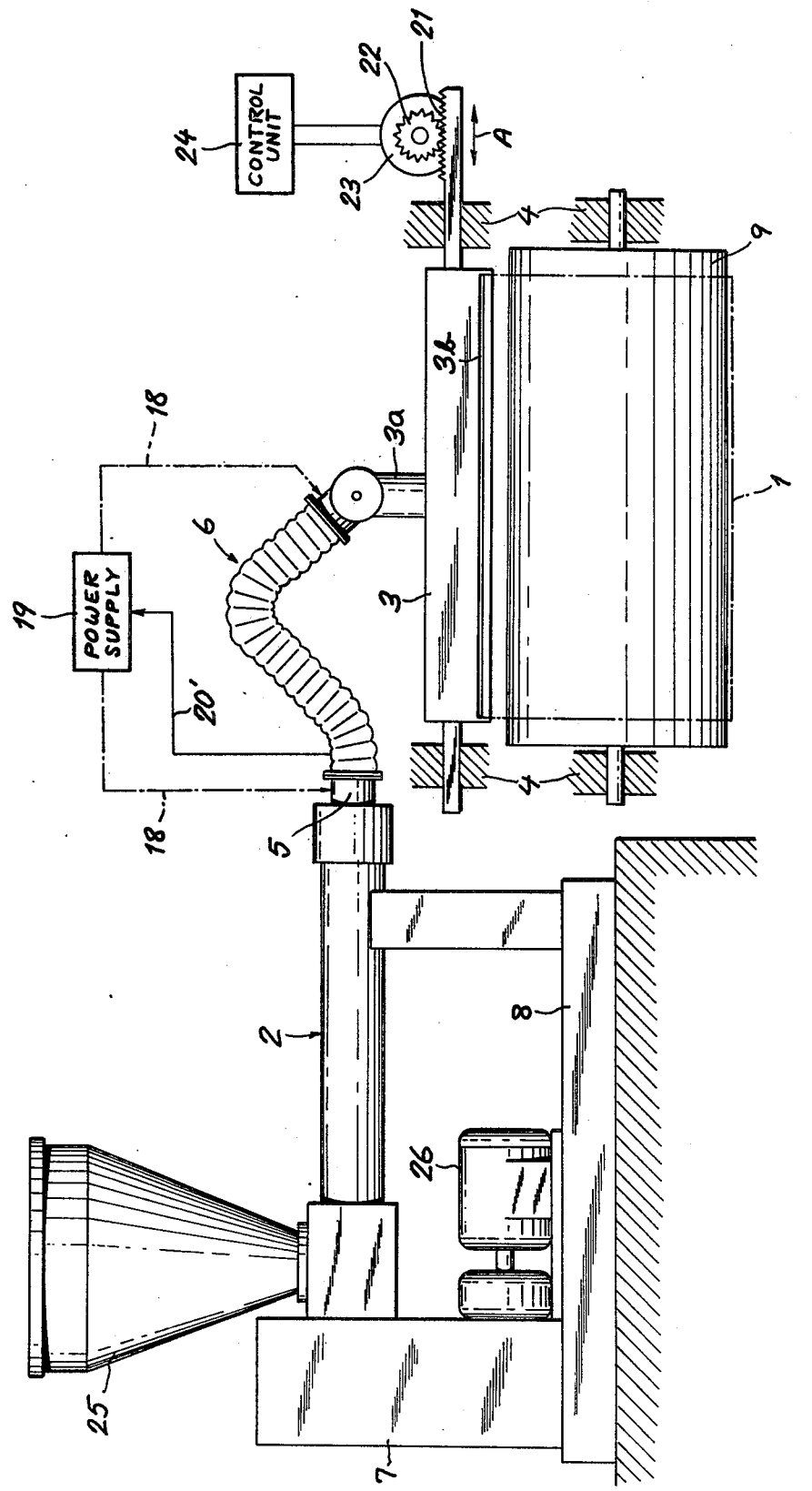
FIG. 1 is a somewhat diagrammatic elevational view of an extrusion system embodying our invention.

In FIG. 1, we have shown an apparatus for the production of a thermoplastic foil comprising an extrusion press 2 of conventional constuction. The press 2 is mounted on a frame 7, rising from a base 8, and is powered by a motor 26 driving a worm in its extruder barrel or cylinder. At the intake end of the extrusion press, a hopper 25 is provided for feeding the barrel with granular or pulverent thermoplastic material, e.g. polyethylene. The press 2 can be heated in the conventional manner.

At its discharge end, the extrusion press 2 is provided with an outlet 5 which, in accordance with our invention, is connected by a flexible duct 6 with an entrance port 3a of a wide-slot shaping die 3 having a nozzle 3b. A foil 1, in a more or less plastic state, emerges with substantially its final thickness and width from that nozzle. The die 3 is movably mounted on a stationary support 4, next to a cooling drum or roller 9, by means of a rack 21 engaged by a pinion 22 on the shaft of a motor 23. This motor can be operated periodically by a controller 24 to reciprocate the die 3 in a horizontal direction parallel to the drum axis as represented by an arrow A.

The foil 1 issuing from nozzle 3b, after passing partly around the rotating drum 9, is hardened sufficiently to become self-supporting for further handling and storage.

An electric power supply 19 is connected, via a circuit schematically indicated at 18, to opposite ends of duct 6 in order to energize a heating element embedded in its wall as more fully described hereinafter with reference to FIG. 4.

Figure 2:
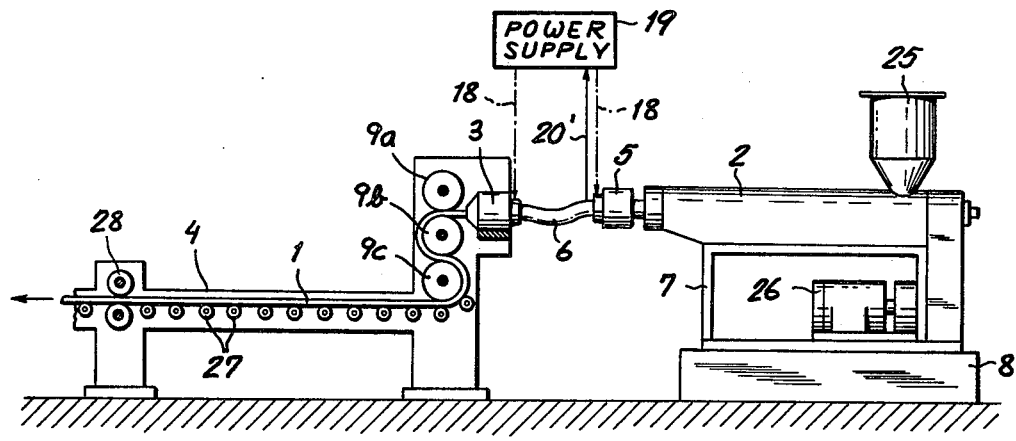
FIG. 2 is a view similar to FIG. 1, illustrating a modified system.
Figure 3:
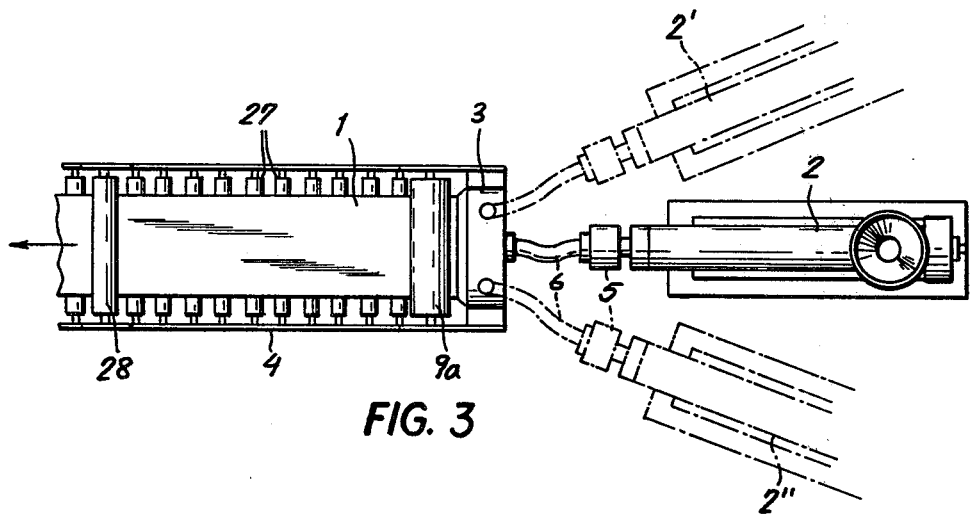
FIG. 3 is a top view of the system shown in FIG. 2.

In FIGS. 2 and 3 we have shown a system generally similar to that of FIG. 1, with corresponding elements designated by the same reference characters. The foil 1 issuing here from the die 3 passes between closely juxtaposed rollers 9a, 9b and 9c for cooling and is then led across a roller track 27 with the aid of transport rollers 28 coveying it to a further destination. As indicated in FIG. 3, die 3 may have several inlets to which plastic material can be fed from a plurality of substantially identical extruders 2, 2' and 2". Conversely, a single extruder could supply several dies.

Figure 4:
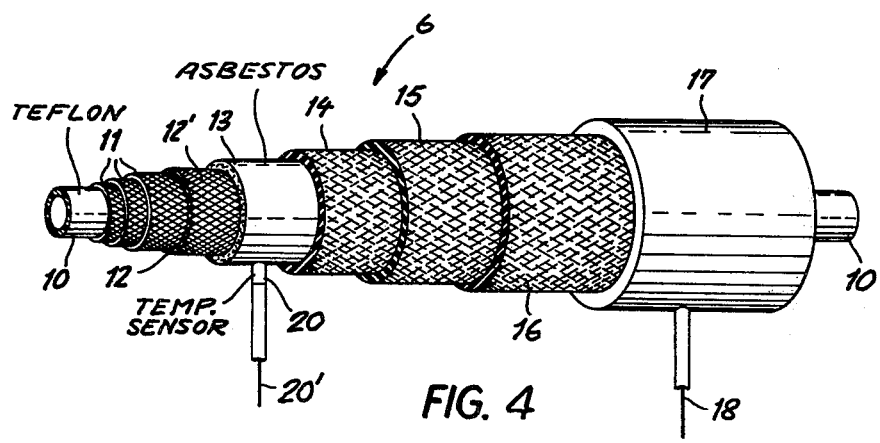
FIG. 4 is a cut-away perspective view of a mass-flow duct adapted to be used in the systems of FIGS. 1 - 3.

Reference will now be made to FIG. 4 for a more detailed illustration of a preferred construction of duct 6. The duct comprises an inner hose 10 of Teflon closely embraced by several reinforcing webs 11, e.g. of steel-wire netting, disigned to absorb the radial pressures of the conveyed mass. An electrically insulating layer 12, e.g. a rubber foil of small thickness and therefore low thermal resistance, carries a heating element 12' in the form of a copper mesh which is traversed by current from the power supply 19 of FIG. 1 or 2. A layer 13 of thermally insulating material such as asbestos, serving as a heat barrier, surrounds the copper mesh 12' and is in turn wrapped into an envelope here shown to include three sheaths 14, 15 and 16 advantageously consisting of silicone rubber reinforced by embedded filaments of steel or polyamide, for example. The entire assembly is connected by a high-pressure clamping sleeve 17 to extruder nozzle 5 at one end and in similar manner to die 3 at the opposite end.

A temperature sensor 20 penetrates the heat-insulating layer 13 and is connected via a line 20' (FIGS. 1 and 2) to power supply 19 in order to stabilize the duct temperature by controlling the energization of heating element 12'. The use of a copper mesh for this heating element insures a substantially uniform temperature level within the duct, designed to maintain the necessary fluidity of the thermoplastic mass, and allows the use of conductors thin enough to impart the desired flexibility to the duct 6. Duct 6 can be used with any extrudable material whose melting point is substantially below that of the Teflon hose 10.

We claim:

1. In an apparatus for producing flexible articles of synthetic resin, including an extruder, a shaping die remote from said extruder and displaceable relatively thereto, a cooling drum disposed downstream of said die for having the articles issuing from said die wound therearound, and a duct in communication with said extruder for conveying thermoplastic material from said extruder to said die, the improvement wherein said duct comprises a flexible tube having heating means embedded in the wall thereof, said tube including an inner hose of polytetrafluoroethylene, at least one reinforcing web of wire netting closely embracing said hose, said heating means being wrapped around said web, a heat-insulating layer enclosing said heating means, and a protective envelope surrounding said layer.

2. The improvement defined in claim 1 wherein said heat-insulating layer consists essentially of asbestos.

3. The improvement defined in claim 1 wherein said envelope comprises a filament-reinforced elastomeric sheath.

4. The improvement defined in claim 3 wherein said sheath consists of silicone rubber.

5. The improvement defined in claim 1 wherein said heating means comprises an electrically insulating tubular layer carrying a copper mesh connected across a source of heating current.

6. The improvement defined in claim 1 wherein said wire netting consists of steel.

* * * * *